No. 755,661. PATENTED MAR. 29, 1904.
C. H. HILL.
BAND CUTTER AND FEEDER.
APPLICATION FILED OCT. 7, 1901.
NO MODEL. 2 SHEETS—SHEET 1.

Witnesses

Inventor
Chauncy H. Hill.
By
Attorneys.

No. 755,661. PATENTED MAR. 29, 1904.
C. H. HILL.
BAND CUTTER AND FEEDER.
APPLICATION FILED OCT. 7, 1901.
NO MODEL. 2 SHEETS—SHEET 2.

Witnesses
E. G. Staude
M. C. Noonan

Inventor
Chauncy H. Hill.
By Paul & Paul
Attorneys.

No. 755,661. Patented March 29, 1904.

UNITED STATES PATENT OFFICE.

CHAUNCY H. HILL, OF HOPKINS, MINNESOTA.

BAND-CUTTER AND FEEDER.

SPECIFICATION forming part of Letters Patent No. 755,661, dated March 29, 1904.

Application filed October 7, 1901. Serial No. 77,763. (No model.)

*To all whom it may concern:*

Be it known that I, CHAUNCY H. HILL, of Hopkins, Hennepin county, Minnesota, have invented certain new and useful Improvements in Band-Cutters and Feeders, of which the following is a specification.

The invention relates to attachments for threshing-machines.

The object of the invention is to provide a band-cutter of such construction that the knives will keep sharp for a long time although in constant use.

A further object is to provide a very easy-running band-cutter and one that can be operated effectively at a slow speed, which is not true of the band-cutters in general use.

A further object is to provide a band-cutter in which all the jerking or jolting that is incident to the operation of machines of this character is eliminated entirely.

Other objects of the invention will appear from the following detailed description.

The invention consists generally in a revolving band-cutter cylinder having a series of knives and means for projecting or thrusting the knives longitudinally into the bundles.

Further, the invention consists in improved means for supporting and operating the reciprocating knives.

Further, the invention consists in improved guards for the knives.

Further, the invention consists in various constructions and combinations, all as hereinafter described, and particularly pointed out in the claims.

Figure 1:
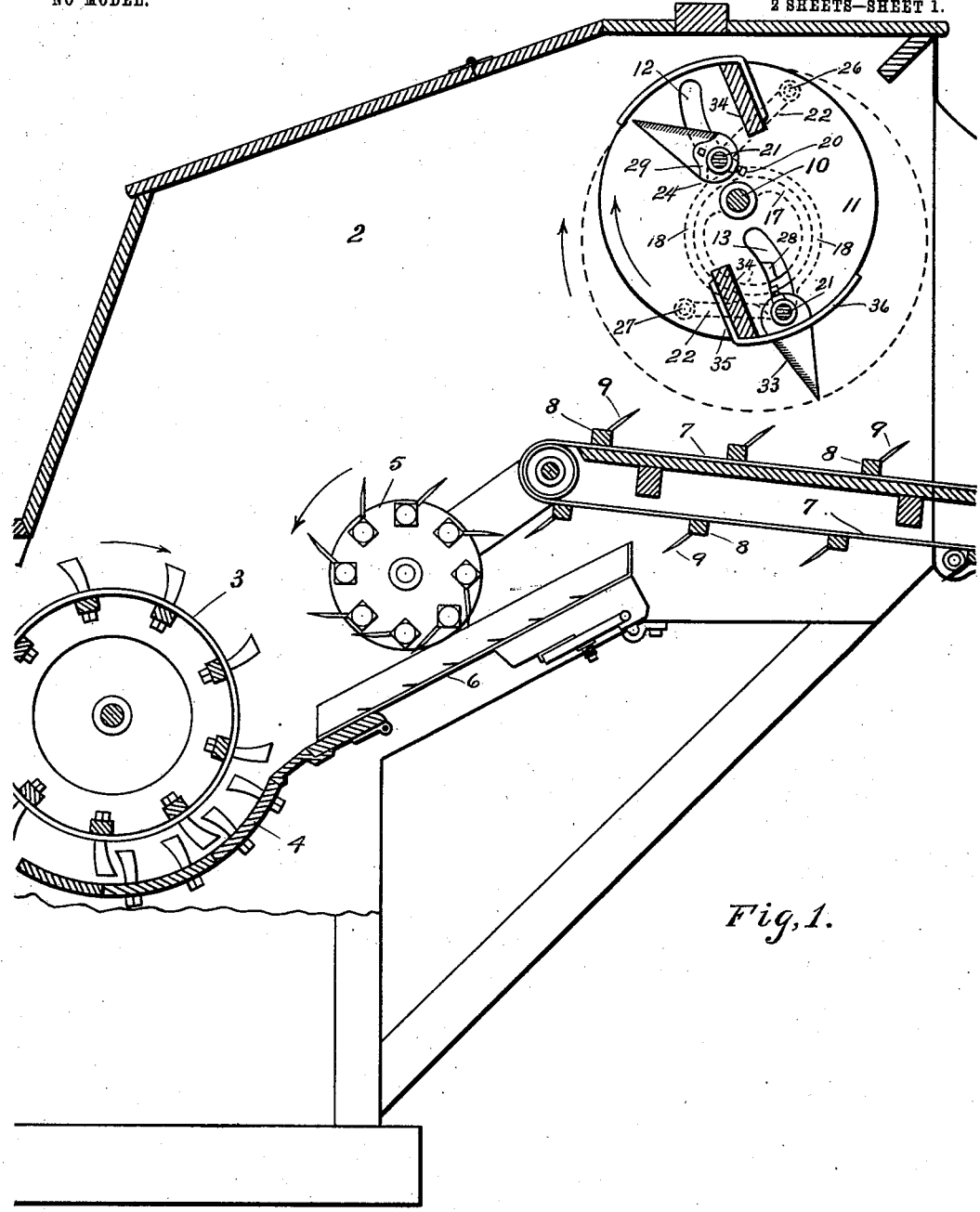
Figure 7:
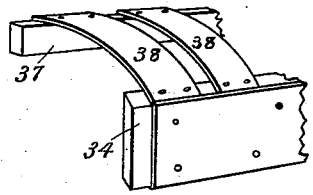
Figure 2:
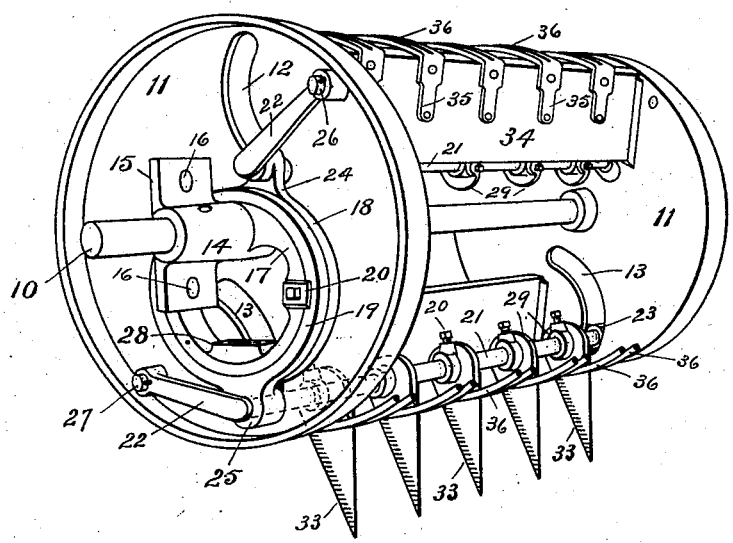
Figure 6:
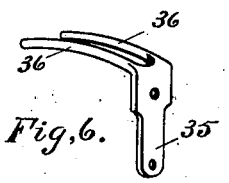
Figure 3:
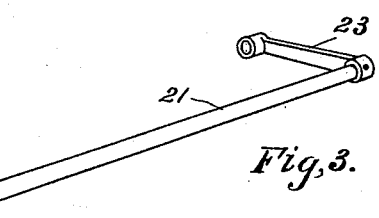
Figure 8:
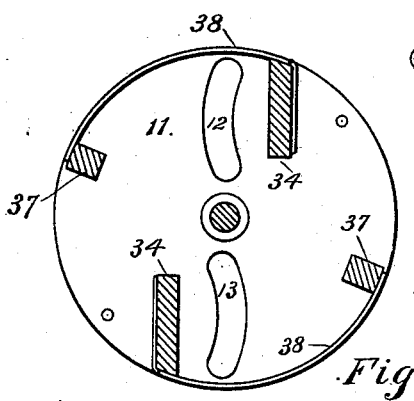
Figures 4, 5:
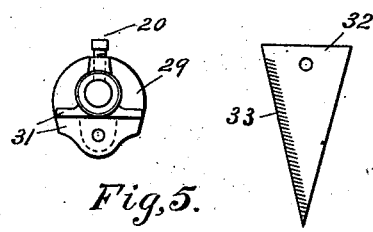

In the accompanying drawings, forming part of this specification, Figure 1 is a vertical section of a band-cutter and feeder embodying my invention. Fig. 2 is a perspective of a band-cutter cylinder. Fig. 3 is a perspective of one of the knife-shafts. Figs. 4 and 5 are details of one of the knives and the means for supporting the same. Fig. 6 is a detail of the knife-guard. Fig. 7 is a perspective of a modified form of guard; and Fig. 8 is a side elevation of one of the cylinder-heads, showing the modified form of guard secured thereon.

In the drawings, 2 represents the band-cutter and feeder casing, 3 the threshing-cylinder, and 4 the concave.

5 is a feed-regulator supported above a pan 6. This feed-regulator and the supports for the pan form the subject-matter of a pending application for an improvement in band-cutters and feeders, filed by me June 7, 1901, Serial No. 63,574, and need not, therefore, be described in detail herein.

7 is a bundle-carrier provided with the usual cross-slats 8, wherein a series of spikes 9 are arranged. These spikes are inclined toward the receiving end of the carrier and serve to hold the lower portions of the bundles while the knives are cutting the bands. Above and near the discharge end of the carrier I provide a band-cutter shaft 10, whereon heads 11 are secured. These heads are each provided upon opposite sides of said shaft with curved radial slots 12 and 13. Loosely arranged on the shaft 10 between the heads 11 and the machine-casing are sleeves 14, having lugs or ears 15, secured to the casing through holes 16. Upon each of these sleeves I provide an eccentric 17, and each eccentric is provided with straps 18 and 19, held in place by a lug 20 within the slots 12. On each side of the shaft 10 I provide knife-shafts 21, having integral cranks 22 at one end and removable cranks at the other. These shafts pass through lugs 24 and 25, provided, respectively, on the eccentric-straps 18 and 19, and the cranks of said shafts are pivoted on studs 26 and 27, that are secured on the cylinder-heads 11. I prefer to provide oil-cups 28 for the eccentric-straps. As the shaft 10 and the heads 11 are revolved the eccentric-straps will of course be operated also, and as the knife-shafts move around the eccentric they will be reciprocated within their slots back and forth from the circumference toward the center of the cylinder-heads. Upon each of the shafts at suitable intervals I provide hubs 29, adjustable by means of set-screws 20 and having lips or flanges 31, between which sockets are formed for the inner ends of knives 32, that are secured therein by bolts or in any other suitable way. These knives are triangular in form, similar to the sickle-sections of a mower, but longer and more tapered. They are provided with serrated or sickle cutting edges 33 and are adapted to enter the bundles and cut the bands without jamming or crushing the straw or being drawn lengthwise over the same. Between the heads 11 I provide bars 34, whereon plates 35 are secured having fingers 36. These plates, with their fingers, are substantially forked shaped to serve as guards between which the knives operate, and as the knives are withdrawn within the circumference of the cylinder-heads any straw that may catch on the knives will be scraped off by the fingers.

In Figs. 7 and 8 I have shown a modification in the form of guard, which consists in providing slats 37, between which and the bars 34 curved sheet-metal plates 38 are arranged. The knives operate in the spaces between these plates in the same manner as described with reference to the fingers. In some cases I may prefer to employ the plates, as they are supported at both ends and cannot be bent out of shape by the pressure of the grain, which might happen with the fingers that are only supported at one end.

In band-cutters and feeders as usually constructed the knives are curved and are drawn across the straw during the operation of cutting the bands. This drawing action of the knives soon dulls their edge, after which they simply jam the bands into the straw and pass over without severing them. In my improved band-cutter the knives are alternately projected in a line substantially with the radius of the cylinder-heads into the bundles of grain. Then as the cylinder is revolved the knives are brought into contact with the bands and cutting them are drawn back into the cylinder and cleared from the straw. In other words, the cylinder being in the position shown in Fig. 1 upon beginning its revolution the knives at the top will be moved outwardly in the direction of their length, as indicated by the dotted lines, and upon reaching a position near the lower side of the cylinder, where they will come in contact with the bundle-bands, the knives will be at the limit of their outward stroke and will then immediately begin to return. During the time that the knives are thrust outward and retracted the bands will be cut and the bundles of grain separated and thrown forward upon the feed-regulator. When the knives are thrust into a bundle, the rotary motion of the cylinder will tend to throw the bundle forward; but this tendency will be resisted by the outwardly-inclined spikes, which engaging the bottoms of the bundles will hold or retract them while the knives are acting on the bands.

A band-cutter of this construction will operate very smoothly and easily. The knives will keep sharp a long time, and as they are projected or thrust on a slight curve into the bundles they will easily cut the bands even though the cylinder is revolved at a much slower speed than band-cutters of the usual construction. As shown by dotted lines in Fig. 1, the knives describe a true circle with respect to the machine-casing, and consequently the jarring and jolting incident to the operation of the usual form of band-cutters will be obviated. The knives entering straight into the bundles will not jam the straw or force the bands down into the bundles, which frequently happens with the old form of knife, and the coöperation of the knives with the inclined spikes tends to separate the bundles and render the use of spreaders between the carrier and the cylinder unnecessary.

Having thus described my invention, I claim as new and desire to secure by Letters Patent—

1. In a band-cutter and feeder, the combination, with a revolving knife-cylinder, of a series of radially-reciprocating knives mounted therein, and means for operating said knives independently of their revolving movement with said cylinder, substantially as described.

2. In a band-cutter and feeder, the combination, with a revolving knife-cylinder, of a series of triangular knives mounted therein, and means for reciprocating said knives radially during the revolution of said cylinder to project them lengthwise beyond and retract them within the circumference of said cylinder, substantially as described.

3. In a band-cutter and feeder, the combination, with a revolving knife-cylinder, of a series of radially-reciprocating knives mounted therein, means for operating said knives, and suitable guards between which said knives are reciprocated.

4. In a band-cutter and feeder, the combination, with a shaft, of heads mounted thereon, shafts carried by said heads substantially parallel with the axis thereof, means for reciprocating said shafts radially with respect to said heads, and a series of band-cutter knives secured on said shafts and projected lengthwise by the movement thereof, substantially as described.

5. In a band-cutter and feeder, the combination, with a shaft and the heads thereon, of knife-shafts carried by said heads substantially parallel with the axis thereof, means for reciprocating said knife-shafts sidewise and radially with respect to said heads, a series of knives provided on said shafts and projected lengthwise beyond the circumference of said heads by the reciprocation of said shafts, and suitable guard-fingers between which said knives are operated, substantially as described.

6. In a band-cutter and feeder, the combination, with a knife-cylinder shaft, of heads secured thereon and provided with radial slots, knife-shafts slidably arranged in said slots, means for reciprocating said knife-shafts to move them toward or from the circumference of said heads, a series of knives provided on said shafts and alternately thrust out beyond and retracted within the circumference of said heads by the movement of said shaft, substantially as and for the purpose specified.

7. In a band-cutter and feeder, the combination, with a knife-cylinder shaft, of heads secured thereon and provided with radial slots, knife-shafts arranged in said slots and provided with crank-arms that are pivotally connected with said heads, means for reciprocating said knife-shafts laterally in said slots, a series of triangular knives provided at intervals on said knife-shafts and projected lengthwise by the outward movement thereof, and suitable guard-fingers between which said knives are reciprocated, substantially as described.

8. In a band-cutter and feeder, the combination, with the casing, of a knife-cylinder shaft mounted therein, heads secured on said shaft and provided with radial slots, knife-shafts arranged in said slots and having cranks pivoted on said heads, eccentrics secured on the said casing, straps provided on said eccentrics and pivotally connected, respectively, with said shafts, whereby the revolution of said cylinder-shaft will reciprocate said knife-shafts in said slots, and a series of knives secured on said knife-shafts and projected substantially in line with the radii of said heads by the outward movement of said shafts, substantially as described and for the purpose specified.

9. In a band-cutter and feeder, the combination, with a revolving knife-cylinder, of knife-shafts mounted therein and reciprocating laterally with respect thereto, and a series of knives adjustably arranged on said shafts and said knives being triangular in form and tapering to a point, for the purpose specified.

10. In a band-cutter and feeder, the combination, with a revolving knife-cylinder, of a series of knives mounted therein and reciprocating radially with respect thereto, means for operating said knives longitudinally during their revolving movement with said cylinder, a bundle-carrier provided beneath said cylinder and a series of spikes provided in said carrier and inclined toward the receiving end thereof to hold the lower portions of the bundles while the knives are cutting the bands, substantially as described.

11. In a band-cutter and feeder, the combination, with a revolving knife-cylinder, of shafts mounted therein substantially parallel with the axis thereof, means for reciprocating said shafts radially with respect to said cylinder, a series of triangular knives mounted on said shafts and alternately projected or thrust outward and retracted by the reciprocation thereof, a bundle-carrier provided beneath said cylinder and adapted to deliver bundles in position to receive the longitudinal thrust of said knives, and a series of spikes or pins provided on said carrier and inclined toward the receiving end thereof to hold or retard the bundles while the knives are cutting the bands, substantially as described.

12. In a band-cutter and feeder, the combination, with a shaft and heads secured thereon, of knife-shafts provided between said heads and substantially parallel with said first-named shaft, means for reciprocating said knife-shafts and in a direction substantially at right angles thereto and laterally with respect to said heads-shaft, a series of knives provided on said knife-shafts.

13. The combination, with a knife-cylinder shaft, of heads secured thereon, a knife-shaft mounted in said heads, means for operating said knife-shaft to move it sidewise toward or from the circumference of said heads and in a direction substantially at right angles to said cylinder-shaft, and a series of knives provided on said knife-shaft and arranged to be thrust out beyond and retracted within the circumference of said heads by the movement of said shaft.

14. The combination, with a knife-cylinder shaft, of knife-shafts arranged substantially parallel therewith, supports provided on said cylinder-shaft and wherein said knife-shafts are movable laterally with respect to said cylinder-shaft, means for reciprocating said knife-shafts, and a series of knives provided on said knife-shafts and arranged to be laterally projected in a direction substantially at right angles to said cylinder-shaft and withdrawn toward the same by the revolution of said cylinder-shaft.

In witness whereof I have hereunto set my hand this 14th day of September, 1901.

CHAUNCY H. HILL.

In presence of—
RICHARD PAUL,
M. C. NOONAN.